United States Patent [19]

Tovar et al.

[11] Patent Number: 4,722,526
[45] Date of Patent: Feb. 2, 1988

[54] GAME METHOD AND APPARATUS FOR USE WHILE VIEWING A SPORTING EVENT

[76] Inventors: Joseph L. Tovar, 3026 Van Sansul Ave., San Jose, Calif. 95128; Herbert J. Green, 1398 Medallion Dr., San Jose, Calif. 95120

[21] Appl. No.: 4,876

[22] Filed: Jan. 20, 1987

[51] Int. Cl.⁴ .................................................. A63F 9/22
[52] U.S. Cl. .................................. 273/1 E; 273/85 G; 273/94
[58] Field of Search ................ 273/1 E, 1 GE, 1 GC, 273/85 G, 88, 94, 138 A, DIG. 28

[56] References Cited

U.S. PATENT DOCUMENTS

| | | | |
|---|---|---|---|
| 4,141,548 | 2/1979 | Everton | 273/DIG. 28 |
| 4,496,148 | 1/1985 | Morstain et al. | 273/94 |
| 4,592,545 | 6/1986 | Fascenda et al. | 273/DIG. 28 |
| 4,662,635 | 5/1987 | Enokian | 273/94 |

*Primary Examiner*—Leo P. Picard
*Assistant Examiner*—MaryAnn Stoll Lastova

*Attorney, Agent, or Firm*—Allston L. Jones

[57] ABSTRACT

The objective of the present invention is for the players to correctly call as many penalties, or infractions of the rules, as possible while viewing a sporting event. Each player is provided with a signalling device which he either activates or throws when he sees what he believes to be an infraction of the rules. The first player to correctly signal the occurrence of the infraction is awarded multiple points and subsequently signalling players are awarded a lesser number of points or penalized for not signalling. A selected number of points are deducted from a player's score when he signals a penalty when none is called by the officials on the field or court and the players not signalling at those times are awarded a selected number of points for not signalling to minimize anticipation of penalties by players. At the end of the game, the player with the highest score is the winner. To keep the game as fair as possible, only penalties called by the officials on the field or court are to be counted as proper penalties in this game.

14 Claims, 6 Drawing Figures

GAME METHOD AND APPARATUS FOR USE WHILE VIEWING A SPORTING EVENT

BACKGROUND OF THE INVENTION

The present invention relates to a game to be played by multiple viewers of sporting events, and more particularly to a game where the first viewer to spot an infraction is awarded multiple points, and subsequent viewers to spot the infraction are awarded a lesser number of points with the viewer with the highest score at the conclusion of the sporting event winning the game.

In many sporting events it is the job of the referee or umpire to assess penalties to a player or a team for infractions of the rules during play. At the same time, many of the fans viewing the sporting event would like to become more involved in the sporting event. In order to do so, many fans boo the officials when a call is made which the viewer believes to be wrong. This at times becomes even more violent with various items being thrown at the officials or the members of the other team.

It would be desirable to have a game method and apparatus for keeping track of the infractions observed by the viewer, either at the event or in front of a TV during a sporting event. This could be used by an official in training but more likely a fan or a group of fans. When more than one fan is involved, it is also desirable to have the apparatus identify at least the first fan to view an infraction, and perhaps others within a time limit after the first, so that the fans in effect are playing a game of spotting infractions as the event proceeds with the fan having the highest score at the end of the sporting event being the winner. The present invention provides such a method and apparatus.

SUMMARY OF THE INVENTION

In accordance with the illustrated embodiment, the present invention provides a method and apparatus for at least one spectator of a sporting event, wherein an official is empowered to assess penalties for infractions of the rules, to play a game the object of which is to be the first to observe and signal when an infraction has occurred in the viewed sporting event. The present invention provides for the first spectator to signal the occurrence of an infraction, that an official also signals, to be awarded multiple points, and subsequent viewers to so signal an infraction to be awarded a lesser number of points. As the game progresses, the individual scores of the participating spectators are accumulated and the one having the highest score at the end of the sporting event is declared the winner.

DESCRIPTION OF THE DRAWINGS

A full understanding of the present invention will be obtained from a detailed description given hereinbelow and the accompanying drawings. Wherever possible, the same reference numbers have been used for the same items from figure to figure. In addition, the drawings are given by way of illustration only, and are not limitative of the present invention. Further, wherein:

FIGS. 2-4 are flow diagrams of several different implementations of a portion of the flow diagram of FIG. 1a.

DESCRIPTION OF THE PREFERRED EMBODIMENTS

The present invention is primarily designed to involve a sports fan directly in a game that he is viewing and that he has not seen before. That game being viewed may be live or recorded. Additionally, it is anticipated that the present invention will generally be played by a number of viewers in front of the same TV either at home, in a bar, or elsewhere, however, it could also be packaged for play in the stadium or arena as well.

The objective of the game of the present invention is for the players to correctly call as many penalties, or infractions of the rules, as possible during a sporting event. It is anticipated that the present invention would be used while viewing games such as football, basketball, soccer, rugby, hockey, baseball or others where penalties are called during action plays. Additionally, to avoid any edge which one or more players may have from having viewed the game earlier, live action is preferred, either televised, or at the stadium or arena.

The game can be played by as many players as desired, however, for televised games five or six players have been found to be about the upper limit when viewing a single TV. Each player is then provided with a signalling device which he either activates or throws when he sees what he believes to be an infraction of the rules. The first player to correctly signal the occurrence of the infraction is awarded multiple points and players who subsequently signal the infraction are awarded a lesser number of points. However, if the players signal a penalty when none is called by the officials on the field or court, points are similarly subtracted from the player's respective accumulated scores to minimize anticipation of penalties by players. In addition, if an infraction is called by an official and a player does not signal, he looses points, and if an infraction is not called by an official which some players have signaled, the non-signalling players will be awarded points. At the end of the game the player with the highest score is the winner. To keep the game as fair as possible, only penalties called by the officials on the field or court are to be counted as proper penalties in this game.

This game can be implemented in many ways either manually or electronically.

Figure 1A:
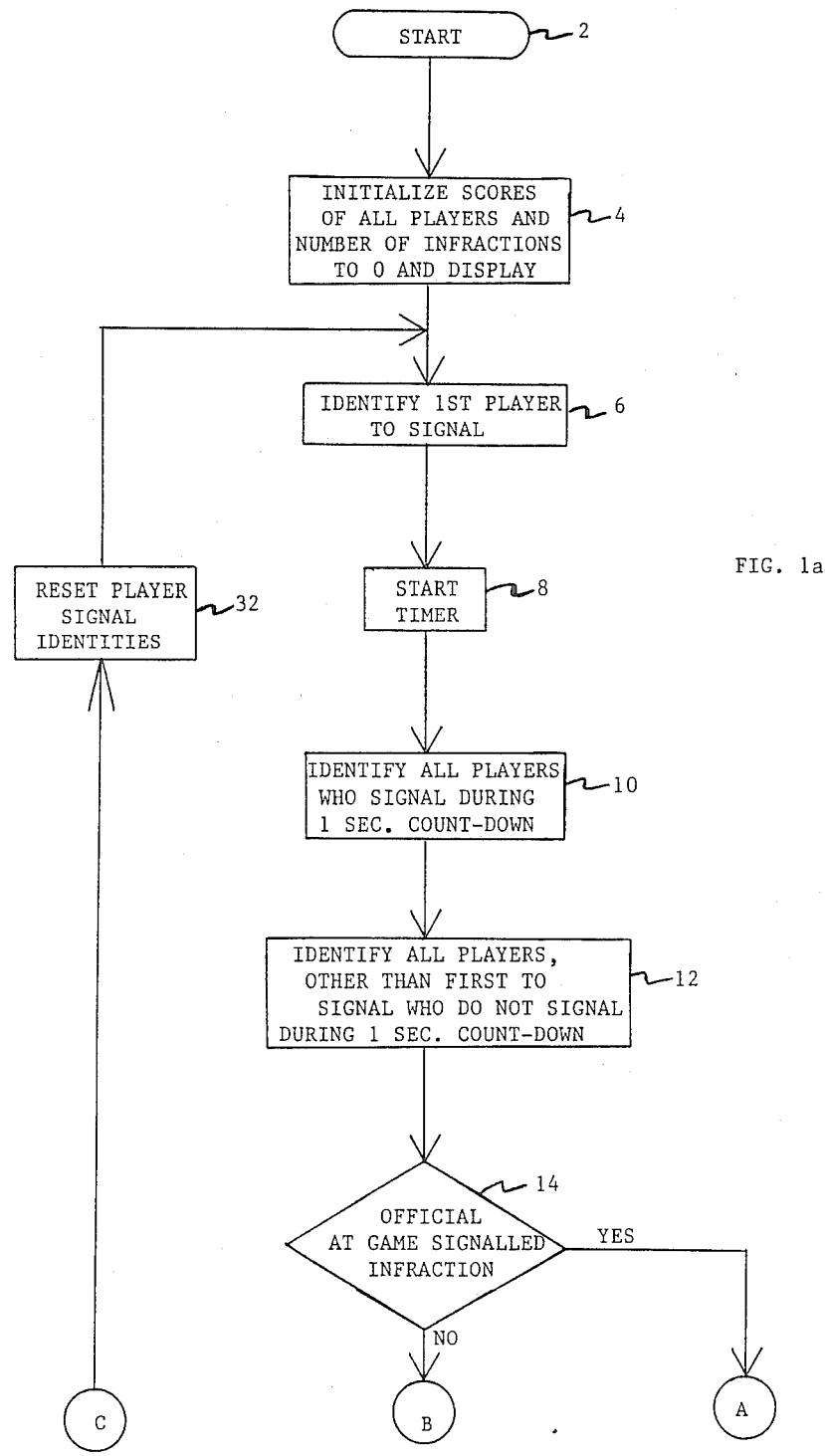
FIGS. 1a and b combine to provide a general flow diagram of the play of the present invention.

Referring to FIGS. 1a and b there is shown a general flow diagram for the play of the game of the present invention. Play begins at START (block 2) which is immediately followed by initialization of each players score to zero (block 4). At this point, the players each begin to observe the same sporting event. When a player believes that he has seen an infraction of the rules he signals using whatever signalling device is provided with the specific embodiment of the invention being used. The first player to so signal is then identified (block 6) and a timer is started (block 8). Next, all of the players to also signal an infraction within a selected time of the first player to so signal are identified (block 10). In block 10 the period of time during which the subsequent signalling must take place has been set at 1 second. Then, all of the players who did not signal or who signaled after the time limit of block 8 are identified (block 12).

A determination is then made as to whether an official of the game being viewed signaled an infraction (block 14). If he did, two points are added to the accumulated score of the first player to signal identified in block 6 (block 22), one point is added to the individual accumulated scores of each player identified in block 10 (block 24), and each of the players who did not signal within the time limit of block 10 or did not signal at all each have one point subtracted from their individual accumulated scores.

Similarly, if no infraction was called by an official at the game, two points are subtracted from the accumulated score of the first player to signal identified in block 6 (block 16), one point is subtracted from the individual accumulated scores of each player identified in block 10 (block 18), and each of the players who did not signal within the time limit of block 10 or did not signal at all each have one point added to their individual accumulated scores (block 20). Following the scoring adjustments of either blocks 16-20 or 22-26, the revised scores are displayed together with the number of actual infractions observed during the game (block 28).

The next test is whether or not the game is over (block 30). If it is over, then flow goes to END (block 34), otherwise the flow continues at block 32 where the order to player signalling is reset and flow is returned to block 6 to again begin the identification of the next first player to signal (block 6) when the next infraction is believed to have been observed. At this point it should be noted that the score values recited above are merely for example and could be set at other values if desired.

Figure 2:
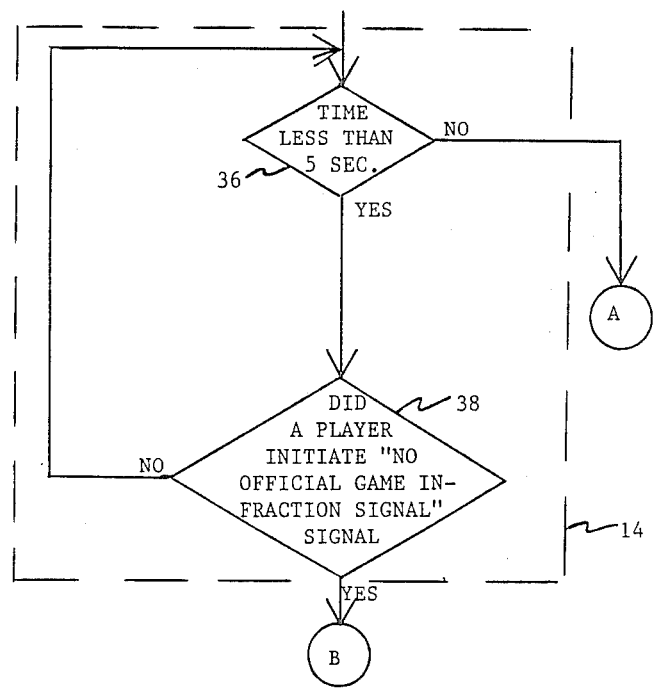
Figure 3:
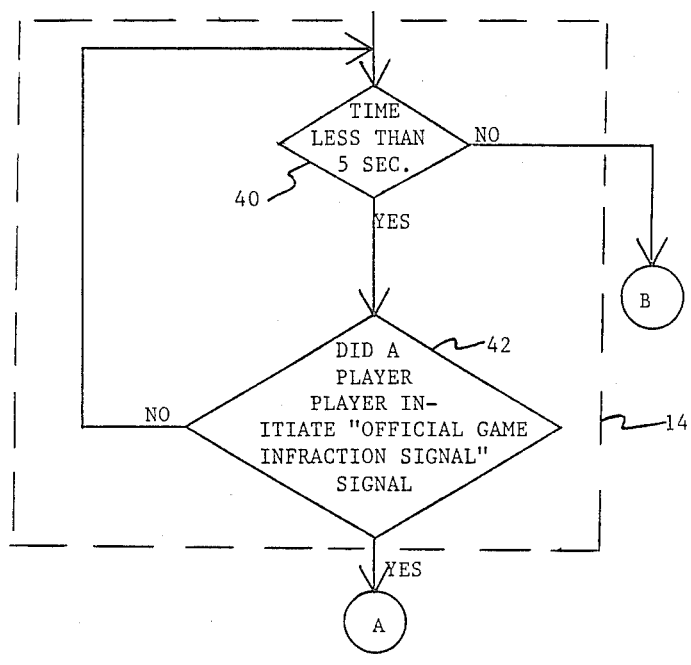
Figure 4:
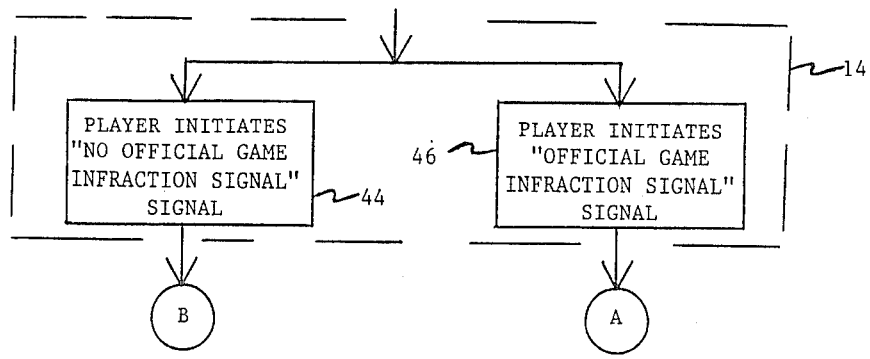

In FIGS. 2-4 alternate embodiments of block 14 in FIG. 1a are presented. In FIG. 2, an infraction is automatically presumed to have been signaled by an official at the game (block 36) if a player does not initiate a "No Official Game Infraction Signal" signal (block 38) within five seconds (block 36) of the start of the timer (block 8), thus the scores are advanced accordingly. If a block 38 signal is initiated, then the scores are decreased accordingly. In FIG. 3 the theory of implementation is just the reverse of that of FIG. 2, whereas in FIG. 4, no adjustment is made in the scores until a player enters the information as to whether an infraction was or was not signaled by an official at the game. When this information is entered, the scores are adjusted accordingly as discussed above. The implementation of FIG. 4 is the most practical of the three illustrated in FIGS. 2-4 particularly since the use of video tape in questioned calls in the NFL.

Figure 1B:
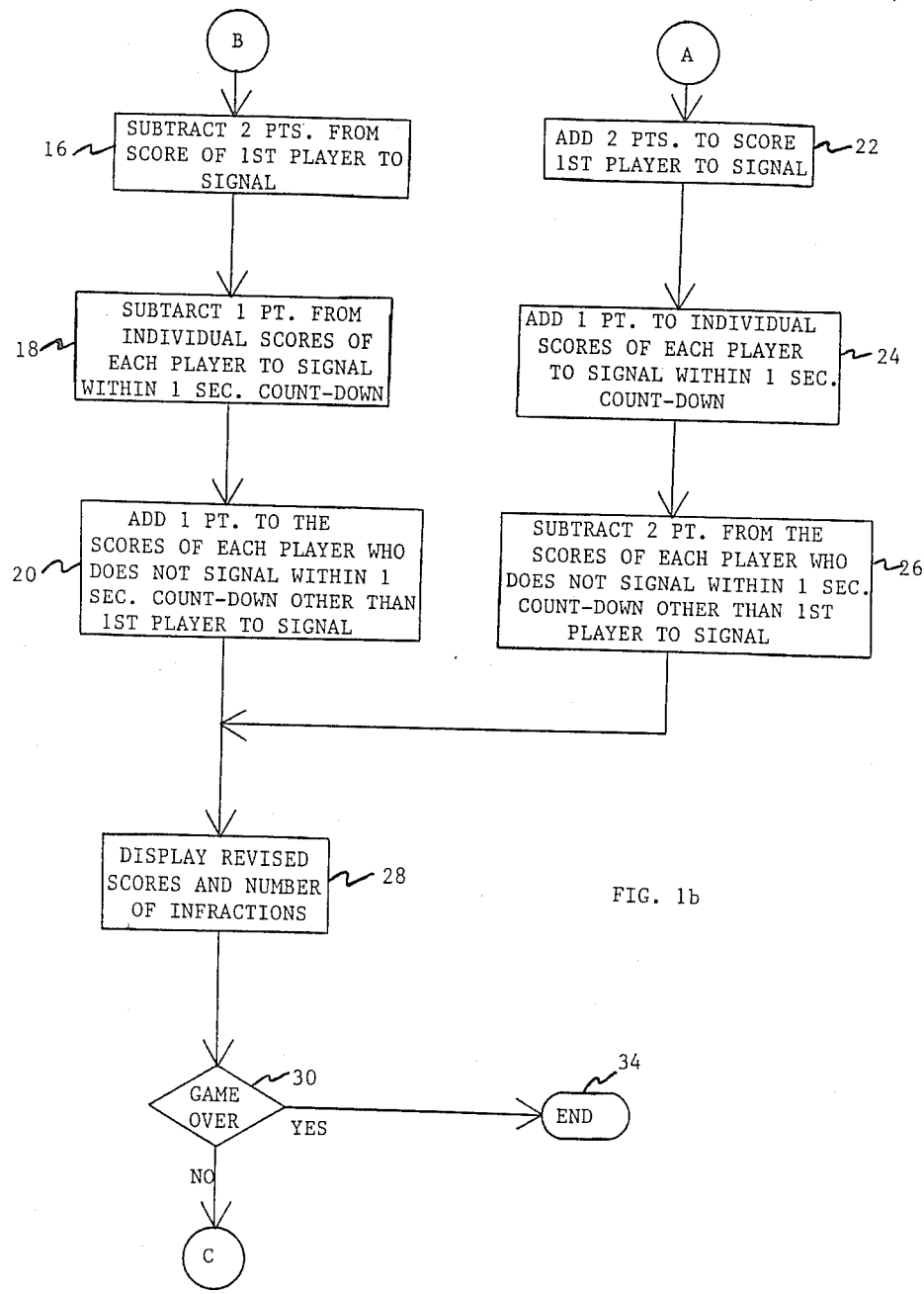
Figure 5:
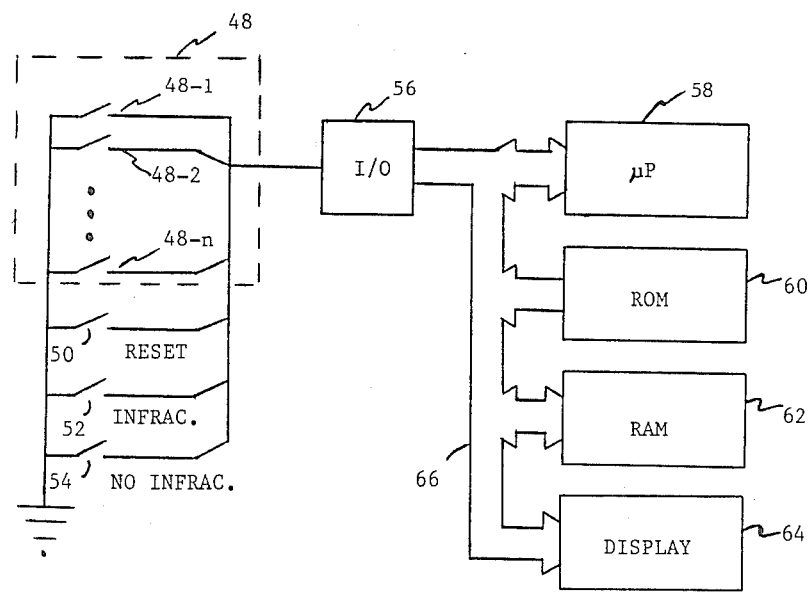
FIG. 5 is a block diagram of a microprocessor implementation of the present invention in accordance with FIGS. 1a, 1b and 4.

Referring next to FIG. 5, there is shown a microprocessor based implementation of the present invention as described in relation to FIGS. 1a, 1b and 4. This embodiment includes a microprocessor 58 which communicates via data bus 66 with I/O 56, ROM 60, RAM 62 and display 64. The individual player signalling devices are shown as push buttons 48-1 through 48-n, where n is the maximum number of such signalling devices provided, in communication with microprocessor 58 via I/O 56. In addition, also coupled to microprocessor 58 via I/O 56 are game control switches 50-54 which will be discussed in detail below.

In operation, a program in accordance with the flow diagrams of FIGS. 1a, 1b and 4 is stored in ROM 60 to control microprocessor 58. RAM 62 provides the temporary memory for the operation of the device including each players accumulated scores and the order of signalling and who signaled when each time an infraction is believed by any player to have occurred. Display 64 includes displays and display drivers, as necessary, to display each player's accumulated score and the accumulated number of actual infractions observed during the game.

In play, the game circuit is initialized or reset (FIGS. 1a and b blocks 4 or 30) by depressing reset switch 50. When one of the players believes he observes an infraction he depresses his switch 48-x and is identified as the first to signal (block 6). Other players who depress their switch 48 subsequent to the first are identified (blocks 10-12). Next, the game is viewed to determine if an official at the game calls an infraction. If an infraction is called by the official, the master player depresses switch 52 (block 46) and the players scores are advanced or decremented as per blocks 22-26. However, if no infraction is called by the official, the master player depresses switch 54 (block 44) and the players scores are decremented or advanced as per blocks 16-20. Finally, the displayed accumulated scores are revised and play continues unless reset switch 50 is depressed.

The embodiment of FIG. 5 could easily be modified to permit the players at the start of play to select between various levels of play difficulty. The difficulty of play could be modified by changing the 1 second timing of block 10, or changing the scoring variation between the players, or both.

While this invention has been described in terms of a microprocessor based embodiment for five players, it is contemplated that persons reading the preceding descriptions and studying the drawings will realize various alterations and modifications where there may be a different number of stages, or other components and circuit designs which may be used to implement the game as described above for any number of players. It is therefore intended that the following appended claims be interpreted as including all such alterations and modifications as fall within the spirit and scope of the present invention.

What is claimed is:

1. A method of playing a game by one or more spectators of a sporting event during which an official is empowered to assess penalties for infractions of the rules of that sporting event, said method comprising, in the order given the steps of:
    (a) signalling by spectators of an observed infraction during said sporting event;
    (b) identifying the spectator who first signaled in step (a);
    (c) identifying each of the spectators who signaled within a selected time period of the spectator identified in step (b);
    (d) identifying each of the spectators not identified in step (b) and (c);
    (e) determining if the official at the sporting event called an infraction by one or more of the spectators viewing the sporting event action after the completion of step (a); and
    (f) advancing or decrementing a score for each spectator if the official called, or did not call, an infraction, respectively, as a function of which group of identified spectators each spectator is individually included with.

2. A method as in claim 1 further including the step of:
    (g) displaying the accumulated score for each spectator.

3. A method as in claim 1 wherein step (f) includes the steps of:

(h) visually observing the official at the sporting event to determine if an infraction is called;

(i) if an infraction is called by the official, advancing the score of the spectator identified in step (b) by m points, advancing the individual score of each spectator identified in step (c) by no points, and decrementing the individual score of each spectator identified in step (d) by p points, where m is greater than n;

(j) if an infraction is not called by the official, decrementing the score of the spectator identified in step (b) by q points, decrementing the individual score of each spectator identified in step (c) by r points, and advancing the individual score of each spectator identified in step (d) by s points, where q is greater than r.

4. A method as in claim 3 wherein m, n, p, q, r and s are integer values, and m is equal to q, n is equal to r, and p is equal to s.

5. A method as in claim 3 wherein m and q are each equal to 2, and n, p, r and s are each equal to 1.

6. A method as in claim 1 wherein the selected time period of step (c) is 1 second.

7. A method as in claim 1 further includes the step of:
(k) repeating steps (a) through (f) throughout the duration of the sporting event.

8. A method as in claim 7 further including the step of:
(l) declaring as the winner of the game the spectator having the highest accumulated score at the end of the sporting event.

9. A game apparatus for use by one or more spectators at a sporting event during which an official is empowered to assess penalties for infractions of the rules of that sportig event, said apparatus comprising:
one signalling means for each participating spectator for the spectator to signal his observation of what he believes to be an infraction during the sporting event;
first identifying means coupled to each signalling means for identifying the spectator who first signaled his observation of what he believes to be an infraction;
second identifying means coupled to each signalling means for identifying each of the spectators who signaled his observation of what he believes to be an infraction within a selected time period of the spectator identified by the first identifying means;
third identifying means coupled to each of the signalling means for identifying each of the spectators not identified by the first and second identifying means;
means for determining if the official at the sporting event called an infraction by one or more of the spectators viewing the sporting event action after the completion of the spectator signalling; and
scoring means coupled to the determining means and each of the first, second and third identifying means for advancing or decrementing a score for each spectator if the official called, or did not call, an infraction, respectively, as a function of which group of identified spectators each spectator is individually included with.

10. A game apparatus as in claim 9 further including means coupled to the scoring means for displaying the accumulated score for each spectator.

11. A game apparatus as in claim 9 wherein:
said determining means includes a pair of signalling means, one for inputting an indication of an infraction having been called by the official and the other for inputting an indication that an infraction was not called by the official; and
said scoring means includes:
official infraction called scoring means coupled to said one signalling means of the determining means for advancing the score of the spectator identified by the first identifying means by m points, advancing the individual score of each spectator identified by the second identifying means by n points, and decrementing the individual score of each spectator identified by the third identifying means by p points, where m is greater than n;
no official infraction called scoring means coupled to said other signalling means of the determining means for decrementing the score of the spectator identified by the first identifying means by q points, decrementing the individual score of each spectator identified by the second identifying means by r points, and advancing the individual score of each spectator identified by the third by s points, where q is greater than r.

12. A game apparatus as in claim 11 wherein m, n, p, q, r and s are integer values and m is equal to q, n is equal to r, and p is equal to s.

13. A game apparatus as in claim 11 wherein m and q are each equal to 2, and n, p, r and s are each equal to 1.

14. A game apparatus as in claim 9 wherein the selected time period of said second identifying means is 1 second.

* * * * *